US 6,719,108 B2

(12) United States Patent
Hasegawa et al.

(10) Patent No.: US 6,719,108 B2
(45) Date of Patent: *Apr. 13, 2004

(54) VIRBRATION DAMPING DEVICE FOR VEHICLES

(75) Inventors: Koichi Hasegawa, Kasugai (JP); Rentaro Kato, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/805,859

(22) Filed: Mar. 13, 2001

(65) Prior Publication Data

US 2001/0026039 A1 Oct. 4, 2001

(30) Foreign Application Priority Data

Mar. 27, 2000 (JP) ........................................ 2000-086158

(51) Int. Cl.[7] .............................. F16F 7/10; F16F 15/02
(52) U.S. Cl. ...................... 188/378; 267/136; 267/141; 267/292; 188/268
(58) Field of Search ...................... 188/378–380, 188/268; 267/136, 292–294, 152, 137, 141; 280/124.13, 124.1, 124.152, 124.107; 74/573 R, 574, 572, 573 F; 248/562, 636, 559; 180/300, 312, 902

(56) References Cited

U.S. PATENT DOCUMENTS

| 2,714,161 A | | 7/1955 | Featherstun | |
|---|---|---|---|---|
| 3,612,222 A | | 10/1971 | Minor | |
| 4,558,852 A | * | 12/1985 | Steiner et al. | 267/137 |
| 5,724,862 A | | 3/1998 | Hannah et al. | |
| 5,746,069 A | | 5/1998 | Kim | |
| 5,941,133 A | | 8/1999 | Wierzba et al. | |
| 6,125,977 A | * | 10/2000 | Nekomoto et al. | 188/378 |
| 6,333,912 B1 | * | 12/2001 | Sohn | |
| 6,536,566 B2 | * | 3/2003 | Hasegawa et al. | 188/378 |
| 6,554,112 B2 | * | 4/2003 | Kato et al. | 188/379 |
| 2001/0020761 A1 | * | 9/2001 | Hasegawa | 267/141 |
| 2001/0026039 A1 | * | 10/2001 | Hasegawa et al. | 267/292 |
| 2002/0030315 A1 | * | 3/2002 | Kato | |

FOREIGN PATENT DOCUMENTS

| EP | 11-82468 | | 3/1999 |
|---|---|---|---|
| EP | 001138975 A1 | * | 10/2001 |
| FR | 2596122 | * | 9/1987 |
| GB | 561897 | | 6/1944 |
| GB | 950983 | | 3/1964 |
| GB | 2 053 816 A | | 2/1981 |
| JP | 125878 | | 8/1938 |
| JP | 57-52305 | | 3/1982 |
| JP | 64-42591 | | 3/1989 |
| JP | 3-86227 | | 8/1991 |
| JP | 4-46246 | | 4/1992 |
| JP | 9-329182 | | 12/1997 |
| WO | WO00/14429 | | 3/2000 |

\* cited by examiner

Primary Examiner—Douglas C. Butler
(74) Attorney, Agent, or Firm—Beyer Weaver & Thomas, LLP

(57) ABSTRACT

Vibration damping device for vehicles includes: a rigid housing member having an accommodation space and fixed to a vibrative member; and an independent mass member having a rigid mass body and an elastic body layer bonded on the outer surface of the rigid mass body. The independent mass member is non-adhesively disposed in the accommodation space such that an outer surface of the independent mass member is opposed to the inner surface of the housing member with a predetermined gap distance therebetween, to thereby permit displacement of the independent mass member relative to the housing member. The independent mass member and the housing member is brought into elastic impact against each other at respective abutting surfaces thereof in at least one vibrational input direction. The elastic body layer has a spherical outer surface so as to facilitate bouncing displacement of the independent mass member within the accommodation space.

15 Claims, 5 Drawing Sheets

VIRBRATION DAMPING DEVICE FOR VEHICLES

This application is based on Japanese Patent Applications No. 2000-086158 filed Mar. 27, 2000, the contents of which are incorporated hereinto by reference in its entirety.

BACKGROUND OF THE INVENTION

1. Field of the Invention

The present invention generally relates to a vibration damper installed in a vibrative member of a vehicle, for reducing or attenuating vibration of the vibrative member. More particularly, the present invention is concerned with such a vibration damper which is novel in construction and which is suitably applicable to vibrative members such as suspension arms, sub frames, body panels, mounting brackets, and vibrative members used in an engine unit or an exhaustion system, so that the vibration damper exhibits an excellent damping effect with respect to vibrations excited in these vibrative members.

2. Description of the Related Art

As vibration damping means for damping or reducing vibration excited in vehicles such as an automotive vehicle, there are known (a) a mass damper wherein a mass member is fixed to a vibrative member, (b) a dynamic damper wherein a mass member is supported by and connected to the vibrative member via a spring member and (c) a damping material which is a sheet-shaped elastic member and secured to the vibrative member. However, these conventional devices suffer from various potential problems. For instance, (a) the mass damper and (b) the dynamic damper both require a relatively large mass of the mass member, and exhibit desired vibration damping effect only to significantly narrow frequency ranges. (c) The damping material suffers from difficulty in stably exhibiting a desired damping effect, since the damping effect of the damping material is prone to vary depending upon the ambient temperature.

The present assignee has been disclosed in International Publication WO 00/14429 a novel vibration damper used for an automotive vehicle, which includes a housing member having an inner space and fixed to the vibrative member, and an independent mass member which is accommodated in the inner space of the housing member without being bonded to the housing member, so that the independent mass member is displaceable or movable relative to the housing member, while being independent of the housing member. In the disclosed vibration damper, the independent mass member is forced to move into and impact the housing member, upon application of a vibrational load to the damper, whereby the vibration of the vibrative body is effectively reduced or absorbed based on loss or dissipation of energy caused by sliding friction generated between the abutting surfaces of the mass member and the housing member and caused by collision or impact of the independent mass member against the housing member. This proposed vibration damper is capable of exhibiting a high damping effect over a sufficiently wide frequency range of frequency of input vibrations, while having a relatively small mass of the mass member.

In order to stably establish a desired damping effect of the vibration damper disclosed in the above-indicated document, it is required that the independent mass member is brought into impact directly against the housing member in a vibration input direction in which vibrations to be damped is applied to the vibration damper. In the case where the vibrational loads are applied in various vibration input directions to the vibration damper, for example, there is a need for disposing the independent mass member in the accommodation space such that the independent mass member is movable or displaceable relative to the housing member in every vibration input direction.

In order to stably exhibit a desired damping effect, the vibration damper is further required to effectively provide a bouncing displacement or movement of the independent mass member in the accommodation space, upon application of a vibrational load to the vibration damper, whereby the independent mass member is repeatedly brought into impact on and bounce off the housing member so as to repeatedly apply impact energy to the housing member. To meet this end, there is a need for reducing friction at an interface formed between the independent mass member and the housing member upon abutting or sliding contact of the independent mass member with the housing member.

In order to stably establish the desired damping effect of the vibration damper, there is yet further required to stabilize the condition of the impact between the independent mass member and the housing member. For instance, it should be stabilized an abutting portion or an abutting surface area of the independent mass member at which the independent mass member impacts on the housing member.

SUMMARY OF THE INVENTION

It is therefore an object of this invention to provide an improved vibration-damping device for vehicles capable of exhibiting a desired damping effect with respect to vibrations applied thereto in a plurality of vibration input directions.

It is another object of this invention to provide an improved vibration-damping device for vehicles, which permits a decreased friction at the interface formed between the independent mass member and the housing member, upon abutting or sliding contact of the independent mass member with the housing member, leading to decrease in frictional resistance to the displacement of the independent mass member. This vibration damping-device therefore facilitates the bouncing displacement of the independent mass member relative to the housing member, thereby exhibiting an improved vibration damping effect.

It is yet another object of this invention to provide an improved vibration-damping device for vehicles capable of exhibiting a desired damping effect with high stability, owing to stabilized condition of impact of the independent mass member on the housing member.

The above object may be achieved according to the principle of the present invention, which provides a vibration-damping device for damping vibrations of a vibrative member of a vehicle, comprising: (a) a rigid housing member formed integrally with or independently of the vibrative member and being subjected to the vibrations of the vibrative member, the housing member defining an accommodation space; and (b) an independent mass member having a spherical outer surface and disposed non-adhesively in the accommodation space such that the independent mass member is opposed to an inner surface of the housing member defining the accommodation space, with a spacing therebetween, and is displaceable relative to the inner surface of the housing member. The independent mass member and the housing member are brought into direct and elastic impact against each other at respective abutting surfaces thereof in at least one vibration input direction, upon application of the vibrations in the at least one vibration input direction.

In the vibration-damping device of the present invention constructed as described above, the independent mass member has the spherical outer surface. This arrangement makes it possible to arrange the independent mass member to directly and elastically impact against the housing member in a plurality of optional vibration input directions, by only adjusting suitably the configuration of the accommodation space defined by the inner surface of the housing member. Therefore, the vibration-damping device can exhibits an excellent damping effect with respect to vibrations applied in the plurality of vibration input directions.

In the vibration-damping device of the present invention, the independent mass member is brought into abutting or sliding contact with the housing member with a relatively small contact area, owing to its spherical outer surface, leading to a low resistance to the displacement of the independent mass member. For instance, the independent mass member is less likely to be caught in the housing member during its bouncing displacement within the accommodation space of the housing member. This arrangement facilitates the bouncing movement of the independent mass member in the accommodation space of the housing member, whereby the vibration-damping device can exhibit an excellent damping effect with high efficiency, based on the impact or abutting contact of the independent mass member on or with the housing member.

Moreover, the independent mass member having the spherical outer surface permits an elimination of a directional restriction of the independent mass member in the accommodation space, resulting in stabilized condition of the impact of the independent mass member against the housing member. Thus, the vibration-damping device can damp the vibrations of the vibrative member with high stability.

The housing member may be made of metallic materials such as iron or an aluminum alloy, or a synthetic resin material, for example. Preferably, the housing member may be formed of a rigid material having a modulus of elasticity of $5\times10^3$ MPa or more so as to establish a required hardness enough to support the independent mass member and a desired damping effect. Alternatively, the housing member may be made of a foamed body of the rubber or synthetic resin materials. In order to reinforce the independent mass member formed of the elastic body or the formed body, it may be possible to bond a rigid members made of metal to the independent mass member.

It may also be possible that the independent mass member may comprise a mass body formed of rigid materials having a relatively higher gravity such as metal or stones. In the case, at least one of the abutting surfaces of the independent mass member and the housing member is covered by an elastic body layer made of a rubber material or a synthetic resin material, which is formed on and secured to the at least one abutting surfaces.

According to one preferred form of the invention, the independent mass member includes a solid metallic mass body and an elastic body layer formed on and secured to the entire outer surface of the metallic mass body. In this arrangement, the independent mass member is likely to receive the impact load at various points evenly spread over the outer surface of the elastic body layer, owing to the rotation of the independent mass member in the accommodation space, thereby avoiding application of the impact load to only a local portion of the elastic body layer, resulting in improved durability of the elastic body layer and a resultant improved durability of the vibration damping device.

According to another preferred form of the invention, at least one of the abutting surfaces of the housing member and the independent mass member has a Shore D hardness of not greater than 80. This arrangement is effective to assure an improved damping effect of the present vibration-damping device and a reduced impact noise upon impact of the independent mass member with the housing member. For instance, the elastic body layer formed on and bonded to the at least one of the abutting surfaces of the independent mass member and the housing member may preferably have a Shore D hardness of 80 or lower, more preferably, within a range of 20–40, as measured in accordance with ASTM method D-2240. For the above-mentioned improved damping effect and the reduced impact noise, at least one of the abutting surfaces of the independent mass member and the housing member, which is preferably formed of the elastic body layer, is also arranged to have a modulus of elasticity within a range of $1-10^4$ MPa, more preferably, $1-10^3$ MPa, and a loss tangent is not less than $10^{-3}$, more preferably within a range of 0.01–10, preferably.

According to a further preferred form of the invention, the abutting surface of the independent mass member and the abutting surface of the housing member are spaced apart from each other by a distance within a range of 0.05–0.8 mm, more preferably 0.05–0.5 mm, and the independent mass member may be reciprocally movable by a distance within a range of 0.1–1.6 mm, more preferably within a range of 0.1–1.0 mm, between at least two abutting surfaces of the housing member which are opposed to each other with the independent mass member therebetween, in the at least one vibration input direction. This arrangement is effective to establish further improved damping effect of the vibration-damping device of the present invention.

According to a still further preferred mode of the invention, the housing member is made of a rigid material such as a synthetic material, which has a modulus of elasticity within a range of $5\times10^3 - 5\times10^4$ MPa. This results in a minimized impact noise and an ease of tuning of damping characteristics of the vibration-damping device. In the case where the housing member has a relatively low rigidity, the abutting surfaces of the independent mass member and the housing member may be suitably arranged to have a modulus of elasticity which is smaller than that of the housing member. More preferably, the modulus of elasticity of the abutting surfaces of the independent mass member and the housing member are held within a range of $1-10^2$ MPa. This arrangement makes it possible to assure a desired strength and durability of the housing member, and to improve a damping effect of the vibration-damping device with respect to low frequency vibrations, for example.

The configuration of the housing member is not particularly limited. Various configurations may be applicable to the housing member, taking into account the vibration input directions in which vibrations to be damped are applied to the damping device. In a yet further preferred form of the invention, the accommodation space of the housing member has a circular configuration in cross section. In a still another preferred form of the invention, the accommodation space of the housing member has a square configuration in cross section.

When the accommodation space of the employed housing member has a spherical configuration as a whole, i.e., has circular cross sectional shape in all sections, the spacing between the spherical outer surface of the independent mass member and the spherical inner surface of the housing member is made substantially constant in all directions, whereby the vibration-damping device can exhibit an excellent damping effect with respect to all vibrations applied in any vibration input directions. When the accommodation space of the employed housing member has a cube shape, the independent mass member is opposed to each of six plane surfaces of the cubic housing with a substantially constant spacing therebetween. Namely, the independent mass member is reciprocally movable or displaceable by a substantially constant distance between two of the six plane surfaces opposed to each other in each of three directions of axes of the independent mass member, which axes are intersect each other at right angles. Thus, the vibration-damping device can exhibit an excellent vibration damping effect with respect to vibrations applied in the three axial directions. It is noted that the use of the non-spherical accommodation space, such as the cubic accommodation space, permits the independent mass member to impact on or sliding contact with the housing member with a decreased contact area, thereby facilitating further the bouncing displacement of the independent mass member relative to the housing member upon application of the vibrations to the vibration-damping device.

According to a still further preferred form of the present invention, the accommodation space comprises a longitudinal space extending in a longitudinal direction with a constant cross sectional shape, and accommodates a plurality of the independent mass members which are arranged in series in the longitudinal direction. The center axis of such an accommodation space in the form of the longitudinal space may extend straightly or curvedly in the longitudinal direction. The adoption of the longitudinal accommodation space permits an effective arrangement of the plurality of the independent mass members with ease, according to a configuration of a portion of the vibrative member to which the vibration-damping device is installed.

Further the structure of the housing member is not particularly limited. In still another preferred form of the present invention, the housing member is formed of a metallic material by extrusion, and having a bore extending therethrough in an extruding direction, the bore of the housing member defining the accommodation space. The optional number of the bores may be formed in the housing member. If the only one bore is required, a hollow pipe member may be used as the housing member. For instance, a hollow arm as the vibrative member may constitute the housing member. Alternatively, a panel structure having a plurality of the bores juxtaposed with each other may be usable as the housing member. For instance, a floor panel as the vibrative member may constitute the housing member.

According to yet another preferred form of the invention, the single independent mass member is desirably arranged to have a mass within a range of 10–1000 g, preferably 50–500 g. With the mass of the independent mass member to 1000 g or smaller, more preferably 500 g or smaller, the independent mass member is prone to be excite to its bouncing movement or displacement with ease and efficiency, upon application of the vibrational load to the vibration-damping device. With the mass of the independent mass member set to 10 g or larger more preferably 50 g or larger, the vibration-damping device ensures its damping effect based on the impact of the independent mass member on the housing member.

According to a still yet further preferred embodiment, a total mass of the independent mass member is held within a range of 5–10% of the vibrative member. Namely, if the mass of the independent mass member is smaller than 5% of the mass of the vibrative member, the vibration-damping device possibly suffers from difficulty in exhibiting a desired damping effect, and if the mass of the independent mass member is larger than 10% of the mass of the vibrative member, the vibration-damping device suffers from a problem of increase in the overall weight of the device. If the plurality of independent mass members are accommodated in the accommodation space, the total mass of the plurality of independent mass members is desirably arranged to be held within a range of 5–10% of the mass of the vibrative member.

BRIEF DESCRIPTION OF THE DRAWINGS

The above and other objects, features advantages and technical and industrial significance of the present invention will be better understood by reading the following detailed description of the presently preferred embodiments or modes of the invention when considered in conjunction with the accompanying drawings in which.

DETAILED DESCRIPTION OF THE PREFERRED EMBODIMENTS

Figure 1:
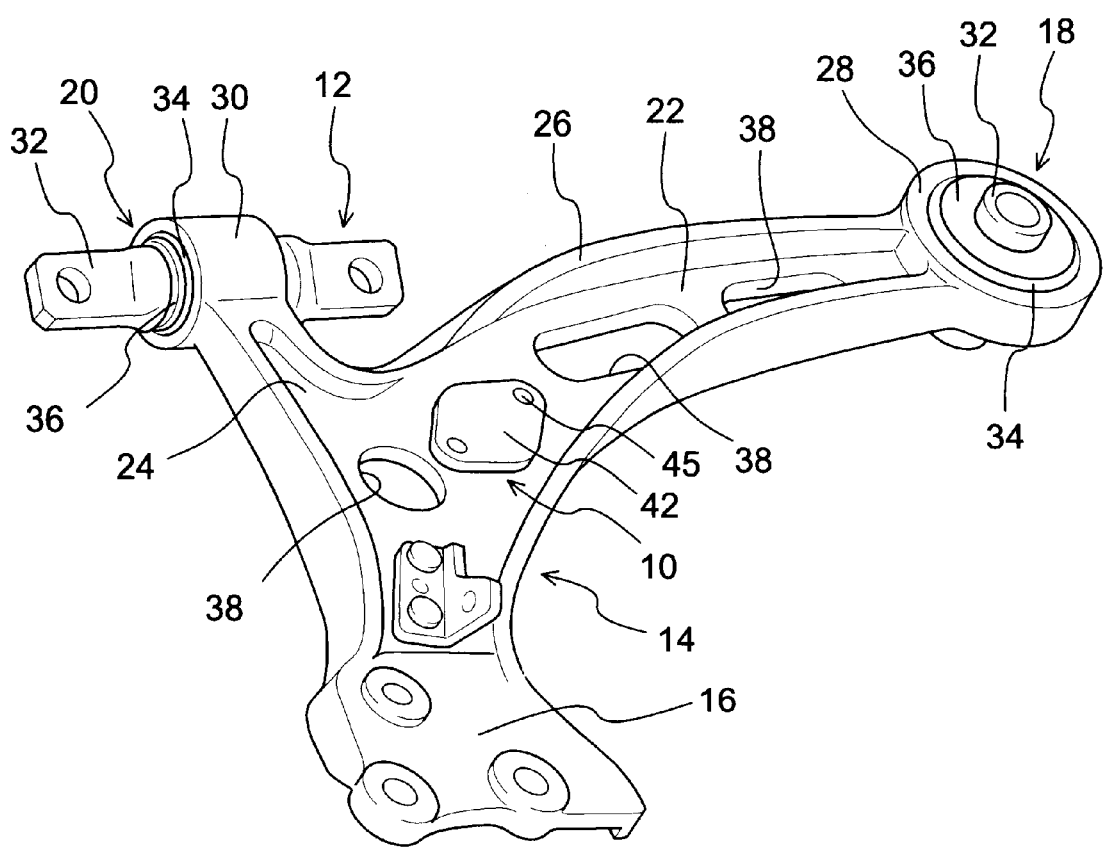
FIG. 1 is a perspective view of a vibration damper constructed according to a first embodiment of the present invention, which is integrally disposed in a front lower arm of an automotive vehicle.
Figure 2:
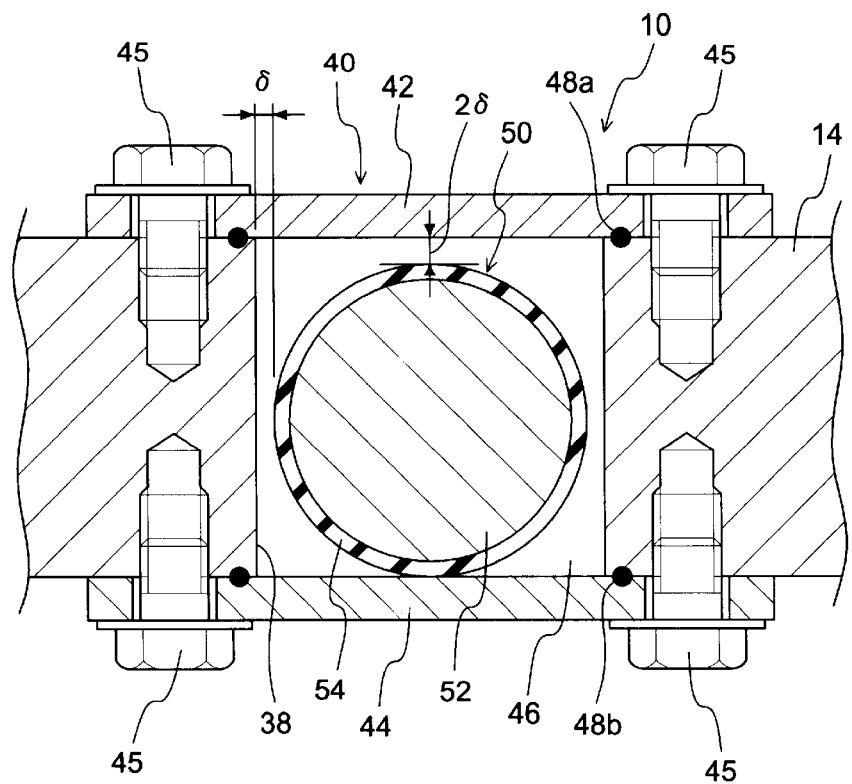
FIG. 2 is an elevational view in vertical cross section of the vibration damper of FIG. 1.

Referring now to FIGS. 1 and 2, there is shown a vibration damper 10 constructed according to a first embodiment of the present invention, which is fixedly disposed in a front lower arm 12 of an automotive vehicle. The front lower arm 12 includes an arm body 14 as a vibrative member in the form of a generally L-shaped flat plate. More specifically, the arm body 14 includes a long arm 22 and a short arm 24 which are connected at ones of opposite end portions thereof with each other at substantially right angle. The arm body 14 further includes a wheel-side mounting plate 16 integrally formed at the connecting portion of the long and short arms 22, 24 thereof, and a first and a second rubber bushing 18, 20 integrally formed at the other end portions of the long and short arms 22, 24, respectively. The vibration damper 10 is fixedly disposed in the long arm 22 of the arm body 14 on the side of the connecting portion. The thus constructed front lower arm 12 is fixed at the wheel-side mounting plate 16 to a supporting portion of a steering knuckle (not shown), while being fixed at the protruding end portions of the long and short arms 22, 24 to a body-side member (not shown) of the vehicle via the first and second rubber bushings 18, 20, whereby a wheel (not shown) connected to the wheel-side mounting plate 16 is pivotally supported by the body via the front lower arm 12.

Described in detail, the arm body 14 is a flat-plate member with a generally constant wall thickness, which is formed of ferrous metals by casting, for example. The peripheral portion of the arm body 14 is bended to form a reinforcing rib 26 as an integral part. A first and a second arm eyes 28, 30 each having a ring shape are formed at the protruding end portions of the long and short arms 22, 24, respectively, such that the axes of the first and second arm eyes 28, 30 extend in respective directions which are substantially perpendicular to each other. The first and second rubber bushing 18, 20 are fixedly assembled in the first and second arm eyes 28, 30, respectively.

Each of the first and second rubber bushing 18, 20 includes an inner rod 32 and an outer sleeve 34 disposed radially outwardly of the inner rod 32 with a predetermined radial spacing therebetween. The inner rod 32 and the outer sleeve 34 are made of metallic materials and are elastically connected with each other by a rubber elastic body 36 interposed therebetween. The outer sleeves 34 of the first and second rubber bushings 18, 20 are forcedly pressed into the first and second arm eyes 28, 30, respectively, whereby the first and second bushings 18, 20 are fixedly assembled in the first and second arm eyes 28, 30. The first rubber bushing 18 has the inner rod 32 in the form of a hollow cylindrical member, while the second rubber bushing 20 has the inner rod 32 in the form of a solid rod member having a small diameter. These hollow and solid inner rods 32 are connected to the body-side member of the vehicles, whereby the front lower arm 12 is mounted on the body of the vehicle.

The arm body 14 has a plurality of through holes 38 formed therethrough in the thickness direction, in order to reduce the weight of the arm body. One of the plurality of through holes 38 is utilized to constitute the vibration damper 10. In the present embodiment, the through holes 38 have a cylindrical shape and straightly extend in the thickness direction with a generally constant circular cross sectional shape.

Described in detail, the vibration damper 10 includes a housing 40 partially defined by the through hole 38. Namely, the opposite openings of the through holes 38 are closed by an upper and a lower housing plate 42, 44 which are placed on and fixed by bolts 45 to the opposite sides of the arm body 14 in which the opposite openings of the through holes 38 are open. That is, the arm body 14, the upper and lower housing plates 42, 44 are cooperated to define the housing 40.

The thus constructed housing 40 provides an accommodation space 46 that is separated from the external space of the housing 40. The upper and lower housing plate 42, 44 are made of a rigid material such as steel, which material has a modulus of elasticity of $5 \times 10^3$ MPa or more. A sealing ring 48a is compressed by and between the upper housing plate 42 and the corresponding surface of the arm body 14, while a sealing ring 48b is compressed by and between the lower housing plate 44 and the corresponding surface of the arm body 14, thereby preventing entrance of water or contaminants into the accommodation space 46.

Within the accommodation space 46 defined in the housing 40, there is disposed an independent mass member 50, such that the independent mass member 50 is independent of the housing 40 and is non-adhesive or not bonded to the housing 40. The independent mass member 50 includes a metallic mass body 52 in the form of a solid spherical block, and an elastic body layer 54 made of a rubber material and formed on and bonded to the entire surface of the metallic mass body 52. The elastic body layer 54 whose outer surface serves as an abutting surface of the independent mass member, has a Shore D hardness of 80 or smaller, more preferably within a range of 20–40, as measured in accordance with ASTM method D-2240. The elastic body layer 54 has a modulus of elasticity within a range of $1–10^4$ MPa, more preferably, $1–10^3$ MPa, and a loss tangent is not less than $10^{-3}$, more preferably within a range of 0.01–10, preferably.

With the independent mass member 50 located in a center of the accommodation space 46, the independent mass member 50 are spaced apart from the inner surface of the housing 40 with a spacing therebetween, over the entire outer surface of the independent mass member 50. In the static state of the vibration damper 10 as shown in FIG. 2, where the housing 40 is not subjected to the vibration excited in the front lower arm 12, the independent mass member 50 is held in contact with the lower housing plate 44 due to gravity acting thereto, while being spaced apart from the upper housing plate 42. A distance: δ between the side wall of the housing 40 serving as one abutting surface of the housing 40 and an opposite portion of an outer surface of the elastic body layer 54, which opposite portion is to be brought into impact against the side wall of the housing 40, is dimensioned preferably within a range of 0.05–0.8 mm, more preferably 0.05–0.5 mm. A distance: 2δ between the upper housing plate 42 serving as another abutting surface of the housing 40 and an opposite portion of an outer surface of the elastic body layer 54, which opposite portion is to be brought into impact against the upper housing plate 42, is dimensioned preferably within a range of 0.1–1.6 mm, more preferably 0.1–1.0 mm.

In the vibration damper 10 constructed according to the present embodiment, as described above, the housing 40 is partially defined by utilizing the arm body 14, whereby the housing 40 is oscillated integrally with the front lower arm 12. Upon application of vibrations to the housing 40, in other words, upon oscillation of the housing 40 integrally with the front lower arm 12, the independent mass member 50 is resiliently displaced independently of the housing 40 within the accommodation space 46. Such a resilient or bouncing displacement of the independent mass member 50 within the accommodation space 46 causes impact of the independent mass member 50 against the housing 40. Thus, the vibration damper 10 exhibits an excellent damping effect with respect to the vibrations excited in the front lower arm 12, based on the impact of the independent mass member 50 on the housing 40.

According to the vibration damper 10 of the present embodiment, the independent mass member 50 is arranged to have a spherical outer surface, while the configuration of the accommodation space 46 defined by the inner surface of the housing 40 is made cylindrical. This arrangement permits that the independent mass member 50 is brought into elastic impact on or abutting contact with the housing 40 under a substantially constant abutting condition, not only in the thickness direction of the housing 40 but also in all directions perpendicular to the thickness direction. Thus, the vibration damper 10 can exhibit a desired damping effect with respect to vibrations applied in the thickness direction of the housing 40 and in the any directions perpendicular to the thickness direction.

The use of the independent mass member 50 with the spherical outer surface is effective to decrease a sliding or abutting contact area of the independent mass member 50 with respect to the inner surface of the housing, during the bouncing displacement of the independent mass member 50 within the accommodation space 46 of the housing 40, making it possible to minimize friction at the interface formed between the abutting surfaces of the independent mass member 50 and the housing 40. This arrangement facilitates the bouncing movement of the independent mass member 50 within the accommodation space 46 of the housing 40, whereby the vibration damper 10 can exhibit high damping effect with high efficiency, based on the impact or abutting contact of the independent mass member 50 on or with the housing 40.

Further, the spherical outer surface of the independent mass member 50 is effective to eliminate directivity thereof, in the accommodation space 46, leading to a further stabilized condition of the impact of the independent mass member 50 on the housing 40. Thus, the vibration damper 10 can exhibit a desired damping effect with stability, based on the impact of the independent mass member 50 on the housing 40.

While the independent mass member 50 includes the elastic body layer 54 is formed on and secured to the spherical outer surface of the metallic mass body 52, the impact load is prone to apply to various points of the outer surface of the elastic body layer 54, owing to the rotation of the independent mass member 50 in the accommodation space 46, resulting in an improved durability of the independent mass member 50.

In addition, the accommodation space 46 defined by the inner surface of the housing 40 is arranged to have the non-spherical shape, e.g., the cylindrical shape in this embodiment. This arrangement is effective to decrease the abutting surface area of the independent mass member 50, upon impact of the independent mass member 50 on the accommodation space, resulting in increased bouncing displacement of the independent mass member 50.

Figure 3:
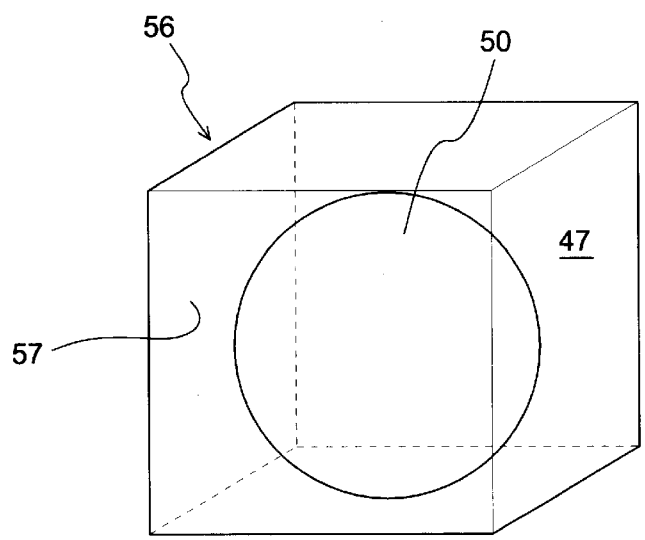
FIG. 3 is a schematic representation of a part of a vibration damper constructed according to a second embodiment of the present invention.

Referring next to FIG. 3, there is schematically shown a concept of a vibration damper 56 constructed according to the second embodiment of the present invention. The vibration damper 56 is integrally disposed in the arm body 14 of the front lower arm 12 of the vehicle, as in the vibration damper 10 of the first embodiment. In the following second embodiment, the reference numerals used in the first embodiment will be used to identify the structurally or functionally identical or corresponding elements, and redundant description of these elements will not be provided, for the sake of a simplicity of the description.

As is apparent from FIG. 3, the vibration damper 56 according to the second embodiment employs an accommodation space 47 having a cubic shape, while the vibration damper 10 employs the accommodation space 46 having a cylindrical shape. Namely, the housing 40 of the vibration damper 56 partially defined by a through hole 57 extending in the thickness direction of the arm body 14 with a constant square shape. The opposite openings of the through hole 57 are closed by the upper and lower housing plate 42, 44 (not shown), whereby the through hole 57 and the upper and lower housing plate 42, 44 cooperate to define the housing 40 whose inner surface define the accommodation space 47 having the cubic shape. The independent mass member 50 is installed in the accommodation space 47, such that the independent mass member 50 is opposed to the inner surface of the housing 40 with a spacing therebetween, with the independent mass member 50 located in the center of the accommodation space 47. More specifically, each of six plane surfaces of the cubic housing 40 serving as abutting surfaces and an abutting portion of the outer surface of the elastic body layer 54 are opposed to each other with a spacing preferably within a range of 0.05–0.8 mm, more preferably within a range of 0.05–0.5. Namely, the independent mass member 50 is reciprocally movable or displaceable by a distance preferably within a range of 0.1–1.6 mm, more preferably within a range of 0.1–1.0 mm between two of the six plane surfaces opposed to each other in each of three axial directions of the independent mass member 50, which three axial directions are perpendicular to one another.

Like the vibration damper 10 of the first embodiment, the housing 40 of the vibration damper 56 is partially defined by the arm body 14, and accordingly is oscillated integrally with the arm body 14. Therefore, upon application of vibrations to the housing 40, in other words, upon oscillation of the housing 40 integrally with the front lower arm 12, the independent mass member 50 is resiliently displaced independently of the housing 40 within the accommodation space 47. Such a resilient or bouncing displacement of the independent mass member 50 within the accommodation space 47 causes impact of the independent mass member 50 against the housing 40. Thus, the vibration damper 56 exhibits an excellent damping effect with respect to the vibrations excited in the front lower arm 12, based on the impact of the independent mass member 50 on the housing 40.

In this embodiment, the accommodation space 47 is arranged to have a cubic shape, so that the independent mass member 50 is reciprocally displaceable relative to the housing 40 in the above-indicated three axial directions perpendicular to one another. That is, the independent mass member 50 is movable to impact the housing 40 in the six directions, whereby the vibration damper 56 is capable of exhibiting an excellent damping effect with respect to vibrations applied in the six directions.

Figure 4:
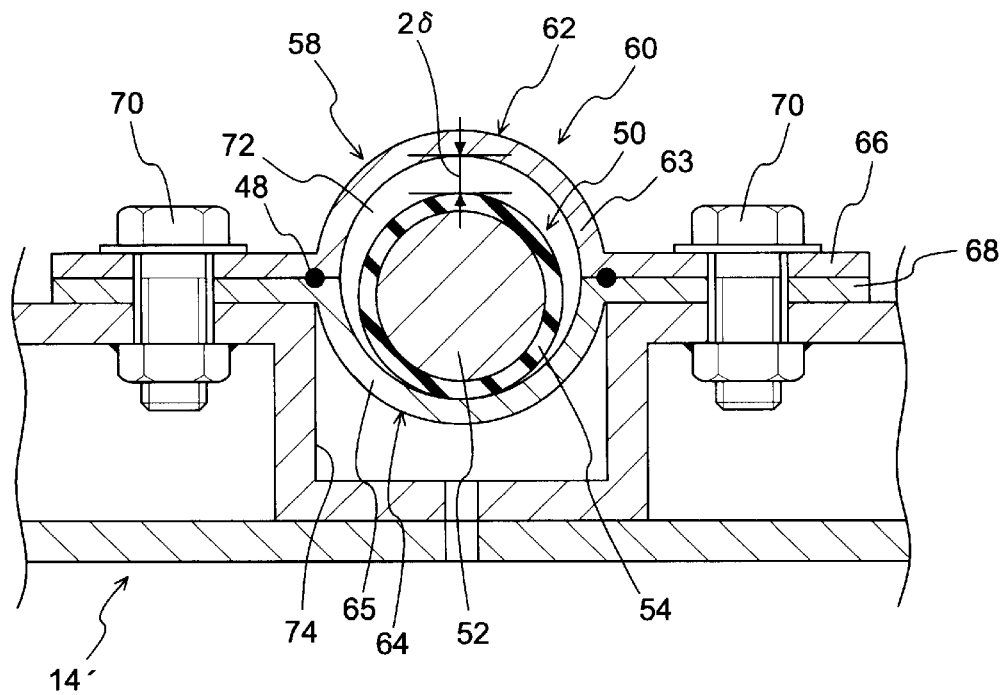
FIG. 4 is an elevational view in longitudinal cross section of a vibration damper constructed according to a third embodiment of the present invention.

Referring next to FIG. 4, a vibration damper 58 constructed according to a third embodiment will now be described. As is apparent from FIG. 4, the vibration damper 58 is fixed to an arm body 14' of a front lower arm, as in the vibration damper 10 of the first embodiment. In the following the third embodiment, the reference numerals used in the first embodiment will be used to identify the structurally or functionally identical or corresponding elements, and redundant description of these elements will not be provided.

Unlike the first and second embodiments, the vibration damper 58 of the third embodiment includes a housing 60 which is independent of the arm body 14'. The housing 60 is a split structure consisting of an upper and a lower housing half 62, 64, each having a generally hollow hemispherical shape, and being made of steel as a rigid material having a modulus of elasticity of not smaller than $5 \times 10^3$. The upper housing half 62 includes a hollow hemispherical body portion 63 and an outward flange portion 66 integrally formed with the outer peripheral portion of the open end face of the body portion 63. Likewise, the lower housing half 64 includes a hollow hemispherical body portion 65 and an outward flange portion 68 integrally formed with the outer peripheral portion of the open end face of the body portion 65. The upper and lower housing halves 62, 64 are butted together at their open-end faces of the body portions 63, 65 with the outward flanges 66, 68 superposed on each other. The thus assembled housing 60 is disposed in a recess 74 of the arm body 14', such that the body portion 63 of the lower housing half 64 is inserted into the recess 74 while the outward flange portion 68 of the lower housing half 64 is placed on the peripheral portion of the opening of the recess 74. The housing 60 is then fixed at the superposed outward flanges 66, 68 to the arm body 14' by fixing bolts 70, whereby the outward flanges 66, 68 are firmly fixed together by the bolts 70. A sealing ring 48 is squeezed by and between the outward flanges 66, 68.

The housing 60 constructed as described above and fixed to the arm body 14' provides a spherical accommodation space 72 defined by the inner surface of the upper and lower housing halves 62, 64.

Within the accommodation space 72, the independent mass member 50 is installed with a clearance therebetween. With the independent mass member 50 located in a center of the accommodation space 72, the independent mass member 50 is spaced apart from the inner surface of the housing 60 by a constant slight spacing: δ(δ=0.05–0.8 mm, more preferably 0.05–0.5 mm), over its entire surface, as seen in a vertical cross section thereof. In the static state of the vibration damper 58 shown in FIG. 4, where the housing 60 is not subjected to the vibration of the vibrative body, the independent mass member 50 is held in contact with the lower most portion of the inner surface of the housing 60 due to gravity acting thereto. In this condition, the upper most portion of the inner surface of the housing 60 is spaced apart by a spacing: 2δ from an opposite portion of the outer surface of the elastic rubber layer 54 of the independent mass member 50, which opposite portion is to be brought into impact against the upper most portion of the inner surface of the housing 60. The spacing: 2δ has a distance preferably within a range of 0.1–1.6 mm, more preferably within a range of 0.1–1.0 mm.

In the vibration damper 58 constructed as described above, the housing 60 is formed independently of the arm body 14' and integrally disposed to the arm body 14', whereby the housing 60 is oscillated integrally with the arm body 14'. Upon application of the vibrations to the housing 60, in other words, upon oscillation of the housing 60 integrally with the arm body 14', the independent mass member 50 is resiliently displaced independently of the housing 60 within the accommodation space 72. Such a resilient or bouncing displacement of the independent mass member 50 within the accommodation space 72 causes impact of the independent mass member 50 against the housing 60. Thus, the vibration damper 58 exhibits an excellent damping effect with respect to the vibrations excited in the front lower arm 12, based on the impact of the independent mass member 50 on the housing 60.

Further, the configuration of the accommodation space 72 of the vibration damper 58 is arranged to have a spherical shape. In this arrangement, the independent mass member 50 is movable into direct and elastic impact against the housing 60 in all directions, whereby the vibration damper 58 can exhibit an excellent damping effect with respect to vibrations applied in any directions.

Moreover, the housing 60 is independent of the vibrative member, e.g., the arm body 14', in this embodiment, making it possible to improve a dimensional accuracy of the accommodation space 72 or the inner surface of the housing 60, irrespective of the accuracy of the arm body 14', whereby the vibration damper 58 may exhibit a desired damping effect with high stability. In other words, the arm body 14 can be manufactured, without taking into account the dimensional accuracy of the accommodation space 72.

Figure 5:
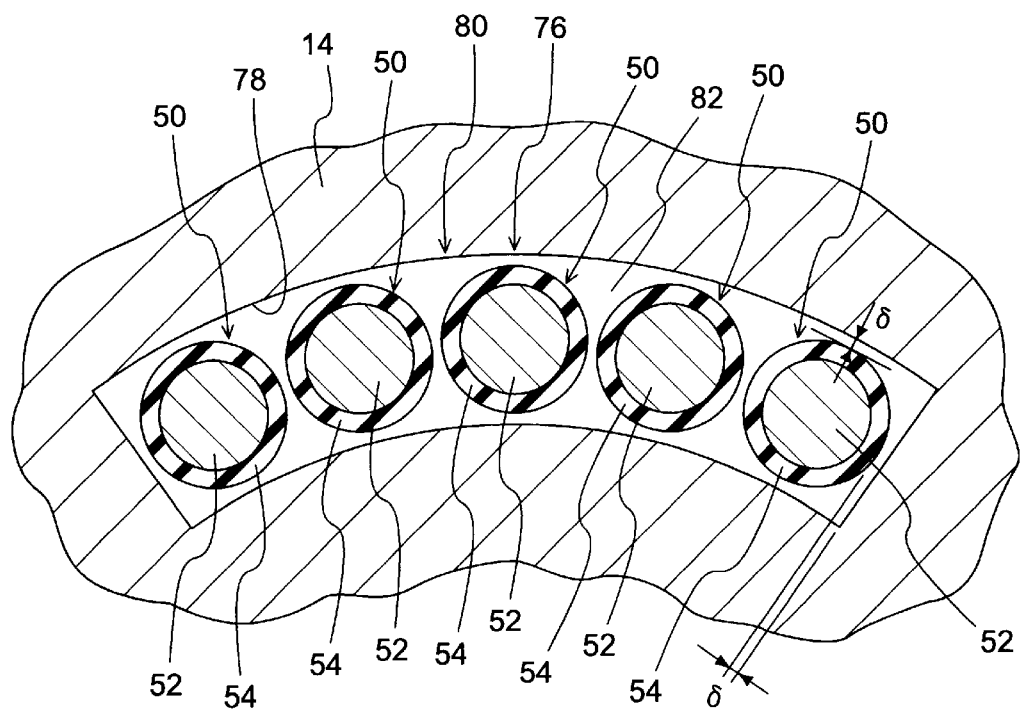
FIG. 5 is an elevational view in longitudinal cross section of a vibration damper constructed according to a fourth embodiment of the present invention.

Referring next to FIG. 5, a vibration damper 76 constructed according to a fourth embodiment of the present invention will now be described. Like the vibration damper 10 of the first embodiment, the vibration damper 76 is fixedly disposed in the arm body 14 of the front lower arm 12. In the following fourth embodiment, the reference numerals used in the first embodiment will be used to identify the structurally or functionally identical or corresponding elements, and redundant description of these elements will not be provided.

Like the first and second embodiment, the vibration damper 76 of the fourth embodiment has an accommodation space 82 which is partially defined by a through hole 78 formed in the arm body 14 of the front lower arm 12. Unlike the first and second embodiments, the through hole 78 has an arcuate shape in its plane view.

The through hole 78 curvedly extends with substantially constant width and depth dimensions (i.e., the thickness of the arm body 14). The width and depth dimensions of the through hole 78 are made substantially equal to each other. The opposite opening of the through hole 78 are closed by an upper and a lower housing plate, respectively (not shown), whereby the through hole 78 and the upper and lower housing plates cooperate to provide a housing 80 curvedly extending with a constant hollow square shape in cross section. The inner surface of the housing 80 defines the accommodation space 82 in the form of a longitudinal space extending in its longitudinal direction with a constant cross sectional shape.

A plurality of independent mass members 50 (e.g., five independent mass members 50, in the present embodiment) are disposed within the accommodation space 82. Each of the independent mass members 50 has an outer diameter which is slightly smaller than the width or depth dimension of the through hole 78 or the accommodation space 82. The five independent mass members 50 are arranged in series in the longitudinal direction of the accommodation space 86. With the five independent mass members 50 being regularly arranged on a center axis of the accommodation space 82 extending in the longitudinal direction of the accommodation space 82 while being located on a central portion in the width and depth directions of the accommodation space 82 (i.e., the center of the accommodation space 82 as viewed in a transverse cross section), the abutting portions of the elastic body layer 54 of the independent mass members 50 are spaced apart from the respective abutting portions of the inner surface of the housing 80 with a constant slight spacing therebetween. The spacing: δ between each of the abutting portions of the elastic body layer 54 and the corresponding abutting portion of the inner surface of the housing 80 serving as an abutting surface, is arranged to have a distance preferably within a range of 0.05 mm–0.8 mm, more preferably within a range of 0.05–0.5 mm. In the static state of the vibration damper 76 (not shown), where the housing 80 is not subjected to the vibration excited in the front lower arm 12, the independent mass member 50 is held in contact with the lower housing plate due to gravity acting thereto. In this condition, the upper housing plate 42 is spaced apart by a distance of 2δ from the corresponding abutting portion of the elastic body layer 54 of the independent mass member 50. The distance 2δ is held preferably within a range of 0.1–1.6 mm, more preferably within a range of 0.1–1.0 mm.

In the vibration damper 76 constructed as described above, the housing 80 is partially defined by the arm body 14, whereby the housing 80 is integrally oscillated with the arm body 14, when vibrations to be damped are excited in the front lower arm 12. Upon application of the vibrations to the housing 40, in other words, upon oscillation of the housing 40 integrally with the front lower arm 12, the each independent mass member 50 is resiliently displaced independently of the housing 80 within the accommodation space 82. Such a resilient or bouncing displacement of the independent mass member 50 within the housing 80 causes impact of the independent mass member 50 against the housing 80. Thus, the vibration damper 76 exhibits an excellent damping effect with respect to the vibrations excited in the front lower arm 12, based on the impact of the independent mass member 50 on the housing 80.

Since the each independent mass member 50 is arranged to have the spherical outer surface, the plurality of independent mass members 50 are accommodated with ease and efficiency even in the curvedly extending accommodation space 82.

Figure 6:
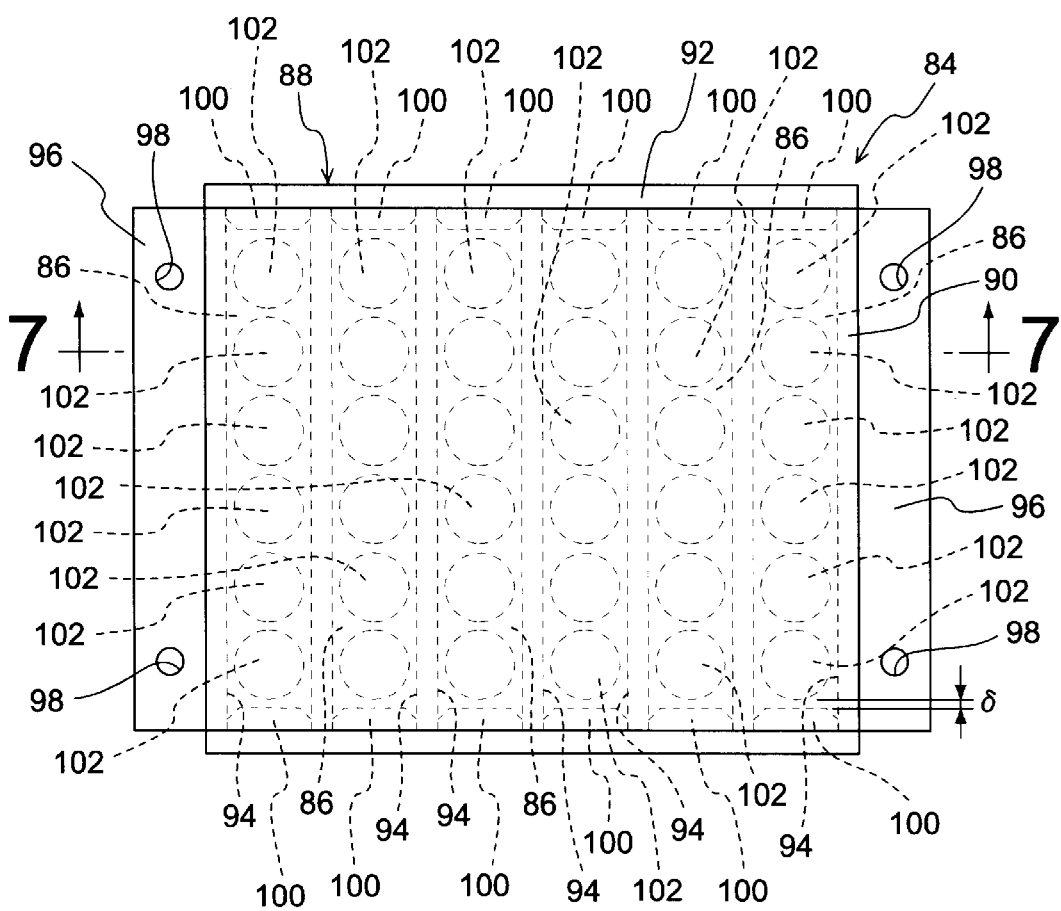
FIG. 6 is a plane view of a vibration damper constructed according to a fifth embodiment of the present invention.
Figure 7:
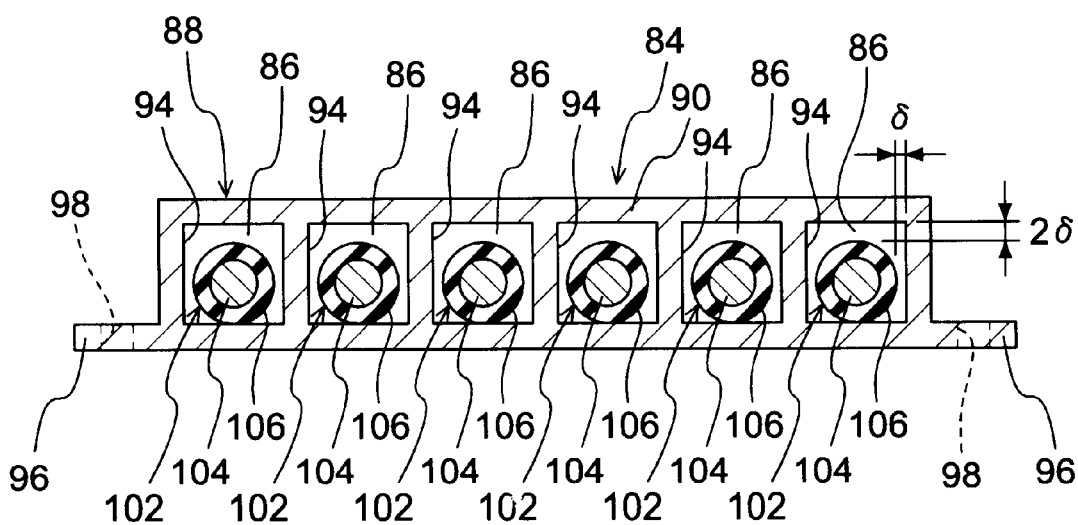
FIG. 7 is a cross sectional view taken along line 7—7 of FIG. 6.

Referring next to FIGS. 6 and 7, a vibration damper 84 constructed according to a fifth embodiment of this invention will now be described. The vibration damper 84 includes a rectangular box-like shaped housing 88 having a plurality of accommodation spaces 86 independent of each other, and a plurality of independent mass members 102 which are disposed within the accommodation spaces 86. The vibration damper 84 is installed on a vibrative member such as a body of an automotive vehicle (not shown), which excites vibrations to be damped, such that the housing 88 is firmly fixed to the vehicle body by a suitable fastening member.

More specifically described, the housing 88 includes a housing body 90 and a pair of cover members 92. The housing body 90 is a generally thick-walled rectangular plate member having a plurality of through holes 94 (e.g., six through holes 94 in the present embodiment) each extending therethrough in a longitudinal direction thereof with a constant square shape in cross section. These through holes 94 extend parallel to each other in the longitudinal direction of the housing body 90 while being spaced apart from each other in a direction perpendicular to the longitudinal direction, i.e., in the width direction of the housing body 90. The housing body 90 also has fixing plates 96, 96 integrally formed at and extending outwardly from the opposite sides thereof, respectively, which sides are opposed to each other in the width direction. Each of the fixing plates 96 has threaded holes 98, so that the housing 88 is attached to the vibrative member by bolts that are screwed in the respective threaded holes 98. In the present embodiment, the housing body 90 is formed of an aluminum alloy by extrusion. The housing body 90 is also made rigid enough to have a modulus of elasticity of $5 \times 10^3$ MPa or more.

Each of the cover members 92 is a rectangular plate member whose configuration is similar to that of the corresponding one of the longitudinally opposite end faces of the housing body 90. The each cover member 92 has a plurality of protrusions 100 (six protrusions 100 in the present embodiment) integrally formed at respective positions of one of opposite major surface thereof, which respective positions correspond to that of openings of the through holes 94 of the housing body 90. The thus formed cover members 92 are fixed to the opposite end faces of the housing body 90 such that the protrusions 100 are forcedly pressed into the through holes 94, respectively, thereby providing a plurality of accommodation spaces 86 which are partially defined by respective through holes 94 and are independent or separated from one another. In the present embodiment, the cover members 92 are both formed by casting of iron or an aluminum alloy, or alternatively by an injection molding of a synthetic resin material.

Each of the plurality of independent mass member 102 includes a metallic mass body 104 in the form of a solid spherical block member, and an elastic body layer 106 made of a rubber material and formed on and secured to the entire surface of the mass body 104. The elastic body layer 106 whose outer surface serves as abutting surfaces of the independent mass member 102, is arranged to have a Shore D hardness of 80 or lower, more preferably, within a range of 20–40, as measured in accordance with ASTM method D-2240. The elastic body layer 106 also has a modulus of elasticity within a range of $1–10^4$ MPa, more preferably, $1–10^3$ MPa, and a loss tangent is not less than $10^{-3}$, more preferably within a range of 0.01–10.

Each of the plurality of accommodation spaces 86 of the housing 88 is arranged to accommodate six independent mass members 102 constructed as described above. These six independent mass members 102 are arranged in series in the longitudinal direction of the accommodation space 86, and are equally spaced apart from each other in the longitudinal direction. With each of the independent mass members 102 located in a central portion in a width and a height direction of the accommodation space 86, the abutting portions of the elastic body layers 106 of the independent mass members 102 are opposed to the respective abutting portions of the inner surface of the through hole 94, with a constant slight spacing therebetween. The spacing has a dimension: $\delta$ which is preferably held within a range of 0.05–0.8 mm, more preferably within a range of 0.05–0.5 mm. In the static state of the vibration damper 84 shown in FIG. 7, where the housing 88 is not subjected to the vibration of the vibrative member, each of the independent mass members 102 is held in contact with the lower surface of the housing 88 due to gravity acting thereto, while the abutting portion of the elastic body layer 106 of the independent mass member 102, which abutting portion is opposed to the upper surface of the housing 88, is spaced apart from the upper surface of the housing 88 with a spacing having a distance: $2\delta$ which is preferably held within a range of 0.1–1.6 mm, more preferably within a range of 0.1–1.0 mm. Namely, the each independent mass member 102 is reciprocally movable or displaceable by a distance: $2\delta$ of the spacing, between the upper and lower surfaces of the housing 88 which are opposed to each other in the thickness direction of the housing 88 and are juxtaposed with the independent mass member 102 therebetween, and between a right-side and a left-side surfaces of the housing 88 which are opposed to each other in the width direction of the housing 88 and juxtaposed with the independent mass member 102 therebetween, as viewed in FIG. 7. It is noted that the upper and lower surfaces, and the right side and left-side surfaces of the housing 88 serve as the abutting surfaces of the housing 88.

In the vibration damper 84 constructed as described above, the each independent mass member 102 is arranged to be displaced relative to the housing 88, and is accordingly brought into elastic impact against the housing 88, upon application of vibrations to the vibration damper 84, whereby the vibration damper 84 can exhibit a desired damping effect based on the impact of the independent mass member 102 on the housing 88. In the present embodiment, particularly, the each independent mass member 102 is reciprocally displaceable relative to the housing 88 in the above-indicated width and thickness directions, i.e., in directions of two axes perpendicular to each other, namely a first axis intersecting at right angle the upper and lower surfaces of the housing 88 and a second axis intersecting at right angle the right-side and left-side surfaces of the housing 88. That is, the independent mass member 102 is movable into impact against the housing 40 in the four directions, whereby the vibration damper 84 is capable of exhibiting an excellent damping effect with respect to vibrations applied in the four directions.

The each independent mass member 102 is arranged to have the spherical outer surface and a relatively small mass, permitting an easy and facilitate accommodation of the plurality of independent mass members 102 within the accommodation space 94, even in the case where the vibration damper 84 has a relatively thin-walled flat-plate configuration.

While the presently preferred embodiments of the invention have been described above in detail for illustrative purpose only, it is to be understood that the invention is not limited to the details of these illustrated embodiments, but may be modified with various changes, modifications and improvements.

For instance, a thin rubber layer may be formed on the inner surface of the housing member. This arrangement permits a use of an independent mass member which is made solely of a rigid material and not coated by the rubber layer.

In the illustrated embodiment, the spherical outer surface of the independent mass member is suitably dimensioned so that the outer surface of the independent mass member is spaced apart from the inner surface of the housing member. However, the desirably dimensioned independent mass member may be formed by using a foamed elastic body. In this case, the independent mass member is partially or entirely formed of the foamed elastic body, by forming a foamable elastic material in the accommodation space of the housing member, which accommodation space has a spherical configuration.

For assuring a desirably minimized impact noise, it is preferable that the independent mass member and the housing member are opposed to each other at their abutting surfaces with a spacing within a range of 0.05–0.8 mm therebetween, in vibration input directions, or between their abutting surfaces. However, the independent mass member and the housing member may be spaced apart from each other with a spacing of 0.8 mm or more therebetween, in the direction in which a vibrational load does not applied.

The vibration damper of the present invention is applicable to a rotational member which is rotatable about a center axis thereof, for damping the vibrations excited therein. For instance, a plurality of independent mass members may be disposed in the rotational member, such as drive shafts and pulleys, such that the plurality of independent mass members are suitably arranged about the center axis of the rotational member, while taking into account a rotational balance of the rotational member, whereby a vibration damper for a rotational member may be provided.

The principle of the present invention may otherwise be embodied. For instance, the vibration damper of the invention may include a plurality of housings which are independent of each other and which are different from each other in size, and a plurality of independent mass members which are accommodated in the respective housings and which have respective size corresponding to the respective housings. This arrangement permits that the vibration damper exhibits excellent damping effects with respect to various vibrations having different frequencies.

In the illustrated embodiment, one or more of the independent mass members is/are disposed in one accommodation space, such that the plurality of independent mass members are arranged in series in the accommodation space. Alternatively, the plurality of independent mass members may be disposed in the accommodation space such that the plurality of independent mass members juxtaposed with each other. Namely, the plurality of independent mass member are desirably arranged in the accommodation space, provided each independent mass member is independently displaceable relative to the housing member so as to directly and elastically impact the housing member at least in a direction in which vibrations to be damped are applied.

Further the configuration of the accommodation space is not particularly limited to the illustrated embodiment. The accommodation space may have a polygonal shape, for example.

While the illustrated embodiments of the invention take form of a vibration damper for an automotive vehicle, it is to be understood that the principle of the invention is applicable to other types of vibration damper for various kinds of vehicles.

As is understood from the foregoing description of the presently preferred embodiments of the invention, the vibration damper of the present invention includes at least one independent mass member which is brought into elastic impact on the housing member, and which is likely to bounce off the housing member based on its elasticity, thereby facilitating bouncing displacement of the independent mass member within the accommodation space. In addition, the independent mass member has a mass that is sufficiently made smaller, further facilitating the bouncing displacement of the independent mass member within the accommodation space. Accordingly, the vibration damper of the present invention ensures the bouncing movement of the independent mass member and elastic impact of the independent mass member against the housing member, even in the case where the vibration damper is installed in a vibrative member of an automotive vehicle, which is prone to excite vibrations have a relatively small vibration energy. Thus, the vibration damper of the present invention is capable of exhibiting an excellent damping effect with respect to the vibrations to be damped in the automotive vehicle, based on the impact of the independent mass member on the housing member.

While the presently preferred embodiments of the invention have been described above in detail for illustrative purpose only, it is to be understood that the invention is not limited to the details of these illustrated embodiments, but may be embodied with various other changes, modifications, and improvement which may occur to those skilled in the art, without departing from the spirit and scope of the invention defined in the following claims:

What is claimed is:

1. A vibration-damping impact device for damping vibrations of a vibrative member of a vehicle through elastic impacts, comprising:

a rigid housing member formed integrally with or independently of the vibrative member and being subjected to the vibrations of the vibrative member, said housing member defining an accommodation space, wherein the rigid housing member is fixed to the vibrative member of the vehicle; and an independent mass member having a spherical outer surface and disposed non-adhesively in said accommodation space such that said independent mass member is opposed to an inner surface of said housing member defining said accommodation space, with a spacing therebetween, and is displaceable relative to said inner surface of said housing member, said independent mass member including a solid metallic mass body and an elastic body layer formed on and secured to an entire outer surface of said metallic mass body, said independent mass member being resiliently displaced to come into direct and elastic impact against said housing member at respective abutting surfaces thereof in a plurality of vibration input directions, upon application of the vibrations in said plurality of vibration input directions, so that the direct and elastic impact causes vibration-damping, and said independent mass member being disposed between a plurality of pairs of said abutting surfaces of said housing member in said plurality of vibration input directions with an approximately constant gap distance of 0.05–0.8 mm, so that the direct and elastic impact causes approximately constant damping effect in said plurality of vibration input directions.

2. The vibration-dampening impact device according to claim 1, wherein said accommodation space of said housing member has a circular configuration in cross section.

3. The vibration-damping impact device according to claim 1, wherein said accommodation space of said housing member has a square configuration in cross section.

4. The vibration-damping impact device according to claim 1, wherein said accommodation space comprises a longitudinal space extending in a longitudinal direction with a constant cross sectional shape, and accommodates a plurality of independent mass members which are disposed in series with each other.

5. The vibration-damping impact device according to claim 1, wherein said housing member is formed of a metallic material by extrusion, and has a bore extending therethrough in an extruding direction, said bore of said housing member defining said accommodations pace.

6. The vibration-damping impact device according to claim 1, wherein said single independent mass member has a mass within a range of 10–1000 g.

7. The vibration-damping impact device according to claim 1, wherein at least one of said abutting surfaces of said housing member and said independent mass member has a Shore D hardness of not greater than 80.

8. The vibration-damping impact device according to claim 1, wherein a total mass of said independent mass member is held within a range of 5–10% of a mass of the vibrative member.

9. The vibration-damping impact device according to claim 1, wherein said housing member is formed of a rigid material having a modulus of elasticity of $5\times10^3$ MPa or more.

10. The vibration-damping impact device according to claim 1, wherein at least one of said abutting surfaces of said independent mass member and said housing member have a modulus of elasticity within a range of $1$–$10^4$ MPa.

11. The vibration-damping impact device according to claim 1, wherein at least one of said abutting surfaces of said independent mass member and said housing member have a loss tangent of not less than $10^{-3}$.

12. The vibration-damping impact device according to claim 1, wherein said elastic impact between said independent mass member and said housing member is caused by bouncing displacement of said independent mass member within said housing member.

13. The vibration-damping impact device according to claim 12, wherein the spherical outer surface of the independent mass member is effective in decreasing sliding or abutting contact area of the independent mass member with the housing member during the bouncing displacement of the independent mass member.

14. The vibration-clamping impact device according to claim 1, wherein the spherical outer surface of the independent mass member allows the independent mass member to provide vibration damping in at least six directions.

15. The vibration-damping impact device according to claim 1, wherein the elastic body layer has an approximately constant thickness overall.

* * * * *